United States Patent [19]
Nitta et al.

[11] Patent Number: 5,950,127
[45] Date of Patent: Sep. 7, 1999

[54] MODE SWITCHING METHOD FOR MOBILE STATION

[75] Inventors: Kazumasa Nitta, Yokosuka; Takashi Ueda, Yokohama; Yoshiyuki Yasuda, Yokohama; Syunichi Kido, Yokohama, all of Japan

[73] Assignee: Mobile Communications Network Inc., Tokyo, Japan

[21] Appl. No.: 08/698,096

[22] Filed: Aug. 15, 1996

[30] Foreign Application Priority Data

Aug. 18, 1995 [JP] Japan ................................ 7-210503

[51] Int. Cl.[6] .................................................. H04B 7/185
[52] U.S. Cl. ........................ 455/426; 455/427; 455/552
[58] Field of Search ................................ 455/422, 426, 455/436, 443, 121, 444, 517, 524, 525, 134, 135, 226.1, 226.2, 427, 428, 550, 552

[56] References Cited

U.S. PATENT DOCUMENTS

| | | |
|---|---|---|
| 5,008,925 | 4/1991 | Pireh . |
| 5,483,664 | 1/1996 | Moritz et al. ............................ 455/428 |
| 5,491,834 | 2/1996 | Chia ........................................ 455/444 |
| 5,499,386 | 3/1996 | Karlsson ................................ 455/444 |
| 5,504,938 | 4/1996 | Redden .................................. 455/427 |
| 5,509,051 | 4/1996 | Barnett et al. .......................... 455/443 |
| 5,513,246 | 4/1996 | Jonsson et al. ......................... 455/443 |
| 5,535,430 | 7/1996 | Aoki et al. .............................. 455/12.1 |
| 5,557,657 | 9/1996 | Barnett .................................... 455/444 |
| 5,628,049 | 5/1997 | Suemitsu ................................ 455/427 |
| 5,708,969 | 1/1998 | Kotzin et al. ............................ 455/63 |
| 5,722,072 | 2/1998 | Crichton et al. ........................ 455/444 |

FOREIGN PATENT DOCUMENTS

| | | |
|---|---|---|
| 0472349 | 2/1992 | European Pat. Off. . |
| 0505341 | 9/1992 | European Pat. Off. . |
| 92/12602 | 7/1992 | WIPO .................................... 455/444 |
| WO 94 06219 | 3/1994 | WIPO . |

OTHER PUBLICATIONS

Drucker, et al., "Integration of Mobile Satellite and Cellular Systems," Proceedings of the International Mobile Satellite Conference, 1993, pp. 119–124.

Del Re, et al., "The GSM Procedures In An Integrated Cellular/Satellite System," IEEE Journal on Selected Areas In Communications, vol. 13, No. 2, Feb. 1995, pp. 421–430.

Primary Examiner—Thanh Cong Le
Assistant Examiner—Marsha Banks-Harold
Attorney, Agent, or Firm—Brinks Hofer Gilson & Lione

[57] ABSTRACT

The ground base station informs an in-level for the ground system, an out-level from the ground system, a timer value and an edge information indicating the edge of the service area, in addition to the broadcast information. It assumes that the mobile station MS moves from position 31 to zone 26 at the edge in the service area, and then moves to position 33. At the position 31, when the received field strength of the ground system decreases, the edge information is not detected, so that the mobile station MS does not switch the communication mode to the satellite system immediately by setting the timer value to three minutes. At position 32, the edge information is detected, so that the mobile station MS sets the timer value to one minute, and sets the out-level to a lower value than the general value. When the field strength is equal to or less than the out-level even after the passage of one minute, the mobile station MS switches the communication mode to the satellite system. Therefore, mode switching does not flap. On the contrary, when the mobile station MS moves from position 33 to position 32, the mobile station MS sets the in-level to a larger value than the general value, so that the flapping of the mode switching is prevented.

4 Claims, 11 Drawing Sheets

MODE SWITCHING METHOD FOR MOBILE STATION

BACKGROUND OF THE INVENTION

1. Field of the Invention

The present invention relates to a mode switching method for a mobile station, which is suitable for mobile communication in which different service areas over-lap.

2. Prior Art

In conventional mobile communication in which there are over-lapping service areas, it becomes necessary to select a communication mode according to the service area. The selection of a communication mode is called mode switching. FIG. 1 is a conceptual drawing showing an example of a mobile communication system having over-lapping service areas. In FIG. 1, each communication mode of the mobile communication system A, B is mutually different, with a part of service area 1 for the mobile communication system A and a part of service area 2 for the mobile communication system B over-lapping. The mobile station MS in the service area 2 moves from position 31 to position 32 in the over-lapped area, and then moves to position 33 in the service area in which only mobile communication system A is applied. In conventional mobile communication, the mobile station MS autonomously recognizes the service area, in which it exists, on the basis of the received field strength. In this case, the mobile station MS observes signals which are transmitted from each base station of systems A and B, and then decides whether it is inside or outside a (particular) service area on the basis of the received field strength. In other words, when the received field strength PA at the mobile station MS of a signal sent from a base station in system A exceeds a fixed value pa1 preset as a system parameter, then the mobile station MS judges its position to be inside system A. Further, when received field strength PA is less than a fixed value pa2 preset as a system parameter, then the mobile station MS judges its position to be outside system A. Similarly, when the received field strength PB at the mobile station MS of a signal sent from a base station in system B exceeds a fixed value pb1 preset as a system parameter, then the mobile station MS judges its position to be inside system B. Further, when received field strength PB is below a fixed value pb2 preset as a system parameter, then the mobile station MS judges its position to be outside system B.

The received field strengths PA and PB of the mobile station MS present at position 31 in system B are PA<pa2 and PB>pb1.

In this case, the mobile station MS selects a system B mode, because the mobile station MS exists in the service area of system B and outside the service area of system A. Next, when the mobile station MS moves from position 31 to an over-lapping area between both service areas, and then reaches position 32, the received field strengths PA and PB become PA>pa1 and PB>pb1.

In this case, the mobile station MS can exist in both areas of systems A and B. Normally, the mobile station MS gives priority to the first selected mode, rather than selecting a plurality of modes simultaneously. Thus, the mobile station MS selects a mode in system B. Furthermore, when the mobile station MS moves from position 32 to a service area in system A only, and then reaches position 33, the received field strengths PA and PB of the mobile station MS become PA>pa1 and PB<pb2.

In this case, the mobile station MS selects a system A mode, because it is present in the service area of system A but outside the service area of system B.

FIG. 2 is a conceptual drawing showing an example of a mobile communication system which has a service area included within another service area. In FIG. 2, service area 1 of the mobile communication system A includes service area 2 of the another mobile communication system B. This example, which assumes that system B has priority over system A in mode selection will explain the case where the mobile station MS moves from position 31 to position 32, and then moves from position 32 to position 33 successively.

The received field strengths PA and PB of the mobile station MS at the position 31, become PA>pa1 and PB>pb1.

Although the mobile station MS exists in both service areas of systems A and B, the mobile station MS selects the mode of system B because system B has priority. Next, when the mobile station MS moves to position 32, the received field strengths PA and PB at the mobile station MS become PA>pa1 and PB<pb2.

In this case, the mobile station MS selects a system A mode because the mobile station MS exists outside the service area of system B. Furthermore, when the mobile station MS moves to position 33, the received field strengths PA and PB of the mobile station MS become PA<pa1 and PB<pb2.

Thus, the mobile station MS exists outside both systems A and B.

Further, when the mobile station MS once more moves to position 32 from position 33, the received field strengths PA and PB at the mobile station MS become PA>pa1 and PB<pb2.

Thus, the mobile station MS is present inside the service area of system A, and outside the service area of system B. Therefore, the mobile station MS selects the system A mode. Furthermore, when the mobile station MS moves to position 31, the received field strengths PA and PB of the mobile station MS become PA>pa1 and PB>pb1.

Although the mobile station MS is present inside both service areas of the systems A and B, the mobile station MS selects the system B mode because system B has priority.

However, in the above-mentioned conventional system, if service areas are discontinuous, or if the mobile station MS is present at the edge of a service area, repeated switching of modes occurs, giving rise to a phenomenon known as flapping. If there are many mobile stations MS in the above-described state, then location registration for mode switching is carried out repeatedly for each mobile station MS. Thus, the traffic on the control channel increases to or exceeds the limit of the processing capacity of the facility, so that congestion occurs.

An explanation of the aforementioned problem will now be made using FIG. 3. In FIG. 3, as in FIG. 1, the service area 2 of the mobile communication system B is included in the service area 1 of the mobile communication system A. In addition, a distinct service area 21 of system B is included inside service area 1 of system A. System B is assumed to have priority over the system A in mode selection.

This example will describe the case where the mobile station MS in service area 2 moves from position 31 to position 32, which is outside service area 2 but inside service area 1, and then moves from position 32 to position 33 inside the service area 21.

The received field strengths PA and PB of the mobile station MS at the position 31 become PA>pa1 and PB>pb1.

In this case, although the mobile station MS can select modes of both systems A and B, the mobile station MS selects the mode of the system B which has priority. At this time, if temporary shadowing occurs, that is, if the mobile station MS enters the shadow of a building or a mountain, interrupting the electronic waves from the basestation, then the received field strengths PA and PB of the mobile station MS at position 31 become PA>pa1 and PB<pb2.

As a result, the mobile station MS determines that it is outside the mode B area, i.e., outside service area 2, and then carries out location registration following mode switching. Once the mobile station MS recovers from the temporary shadowing, the received field strengths PA and PB of the mobile station MS become PA>pa1 and PB>pb1.

Thus, the mobile station MS at position 31 carries out the location registration for system B again after switching the mode, because system B has priority.

Next, when the mobile station MS moves to position 32, the received field strengths PA and PB of the mobile station MS become PA>pa1 and PB<pb2.

The mobile station MS at position 32 selects the mode of system A because the mobile station MS exists outside service area 2 of system B.

Furthermore, when the mobile station MS moves from position 32 to position 33, the received field strengths PA and PB at the mobile station MS become PA>pa1 and PB>pb1.

In this case, although the mobile station MS is present in the service areas of both systems A and B, it selects the mode of system B which has priority. At this time, it is expected that the distinct service area 21 is a very narrow area. Thus, when the mobile station MS reaches position 32 by moving just slight distance, the mobile station MS switches to the mode of the system A, and must register its location in system A through the control channel of that system. Furthermore, when the mobile station MS moves slight distance to again, reach position 33, the mobile station MS switches to the mode of the system B, and must register its location in system B through the control channel of that system.

However, in the above-mentioned conventional system, in the case where there are many mobile stations MS which would give rise to flapping, then the control channel becomes subject to congestion due to traffic for location registration.

Furthermore, a large load is imposed on the network management system. Flapping also occurs in the case of a mobile station MS which exists on a boundary of service area 2 in system B. In addition, the fixed values pa1, pb1 (in-level), and pa2, pb2 (out-level) are stored unchangeably as system parameters in the mobile station MS, so that they cannot be easily changed.

SUMMARY OF THE INVENTION

It is accordingly a primary object of the present invention to provide a mode switching method for a mobile station capable of restraining the increase in traffic on the control channel by preventing flapping when selecting modes.

In an aspect of the present invention, there is provided a mode switching method for a mobile station wherein there is a portion of overlap between the service area of a first mobile communications system and a second mobile communications system, with communication carried out by switching between a first communication mode connected to the first mobile communications system and a second communication mode connected to the second mobile communications system. This premise is characterized in that information having the parameters for mode switching transmits from at least one of the base station of the first mobile communications system or the second mobile communications system to the aforementioned mobile station, which switches between the first and second modes on the basis of the parameters including in information.

Furthermore, it is desirable that the parameter includes at least the field strength threshold, and the mobile station detects the received field strength, compares the detected received field strength with the field strength threshold, and switches the first communication mode and the second communication mode on the basis of the compared result.

Furthermore, it is desirable that the parameter includes at least the quality of the received signal, and the mobile station detects the quality of the received signal, compares the detected quality with the parameter, and switches the first communication mode and the second communication mode on the basis of the compared result.

Furthermore, it is desirable that the information includes edge information which shows that the mobile station exists at a boundary region of the service area, and the mobile station switches the first communication mode and the second communication mode on the basis of whether there is the edge information or not, and on the basis of the parameter of the information.

Furthermore, it is desirable that the mobile station switches the communication mode when conditions for mode switching are maintained during a predetermined time beginning from when the conditions for mode switching comes into existence. In this case, if time information is included in the aforementioned information, then the mobile station MS may set the fixed period of time based on this time information.

Furthermore, it is desirable that the information includes time information indicating time, and the mobile station sets the predetermined time on the basis of the time information.

Furthermore, it is desirable that the first mobile communication system is a ground cellular communication system, the second mobile communication system is a satellite communication system, and the parameter used to switch from the communication mode of the ground cellular communication system to that of the satellite communication system, and the parameter used to switch from the communication mode of the satellite communication system to that of the ground cellular communication system are selected respectively so that the ground cellular communication system takes priority.

Furthermore, it is desirable that the first mobile communication system is a ground cellular communication system, the second mobile communication system is a satellite communication system, and the field strength threshold consists of an in-threshold which is referenced by the mobile station when the mobile station goes into the service area, and an out-threshold which is referenced by the mobile station when the mobile station goes out of the service area, and the in-threshold is increased or the out-threshold is decreased when the mobile station exists in the boundary region of the service area, as compared to when the mobile station does not exists in the boundary region of the service area.

Furthermore, it is desirable that the first mobile communication system is a ground cellular communication system, the second mobile communication system is a satellite communication system, and the predetermined time is set a longer value, when the communication mode is switched from the communication mode of the ground cellular communication system to the communication mode of the satellite communication, then when the communication mode is switched from the communication mode of the satellite communication to the communication mode of the ground cellular communication system.

Moreover, it is desirable that the first mobile communication system is a ground cellular communication system, the second mobile communication system is a satellite communication system, and the predetermined time is set a small value when the edge information is detected then when the edge information is not detected.

BRIEF DESCRIPTION OF THE DRAWINGS

Further objects and advantages of the present invention will be apparent from the following description, reference being made to the accompanying drawings wherein preferred embodiments of the present invention are clearly shown.

In the drawings.

DESCRIPTION OF THE PREFERRED EMBODIMENTS

A. First Embodiment

An explanation will now be made of the first embodiment of the present invention with reference to the drawings.

Figure 1:
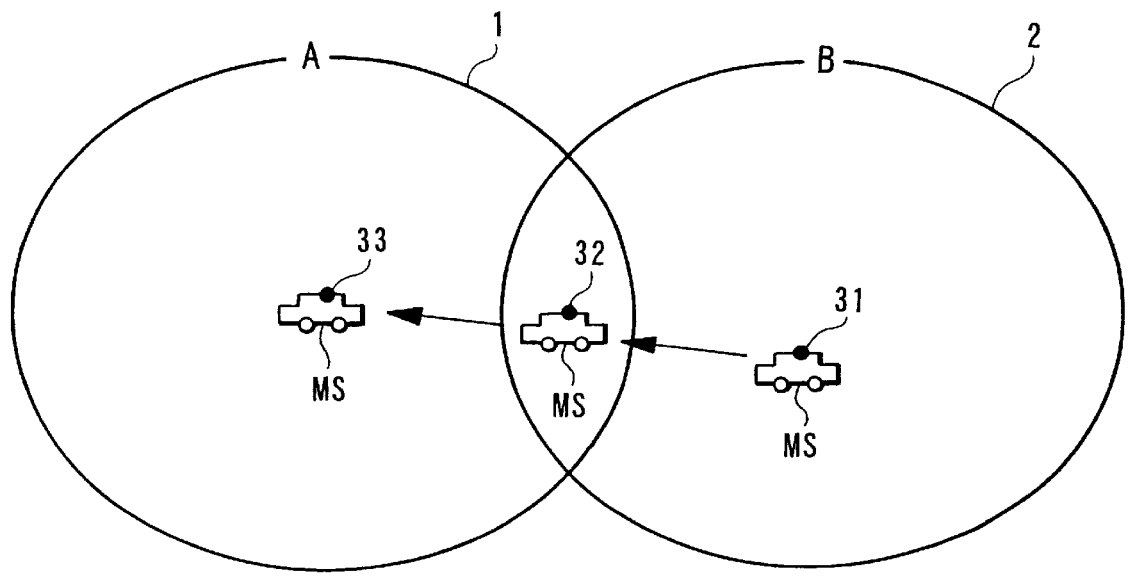
FIG. 1 is a conceptual drawing showing an example of a conventional mobile communication system wherein there is over-lap between service areas.
Figure 2:
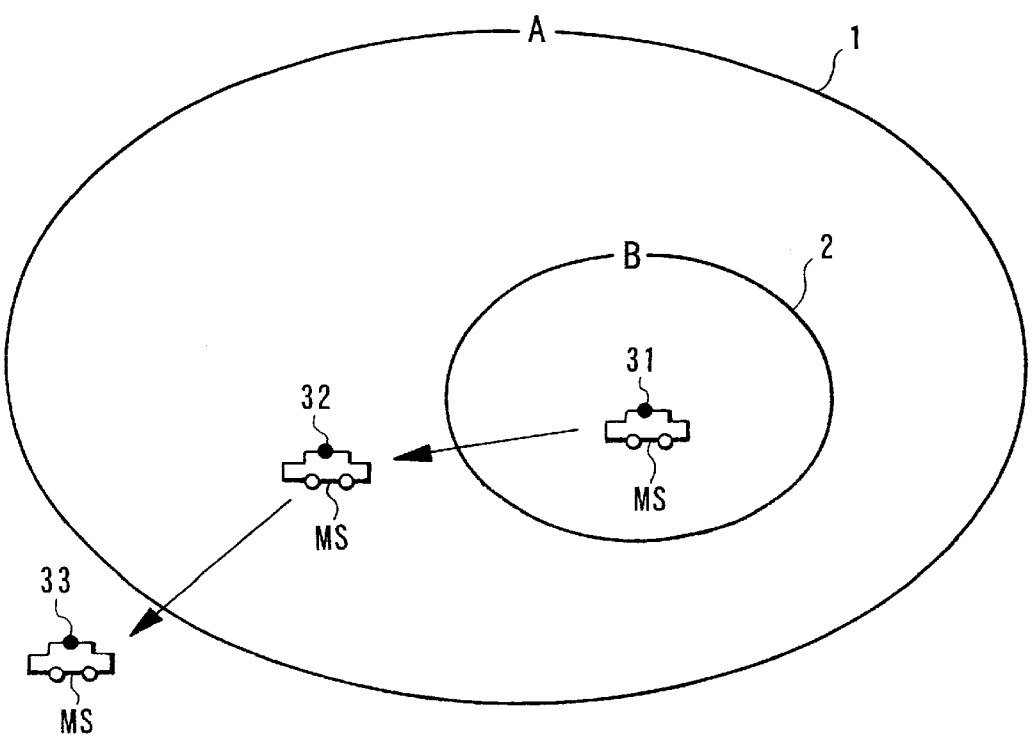
FIG. 2 is a conceptual drawing showing an example of a mobile communication system wherein one service area is included in another service area.
Figure 3:
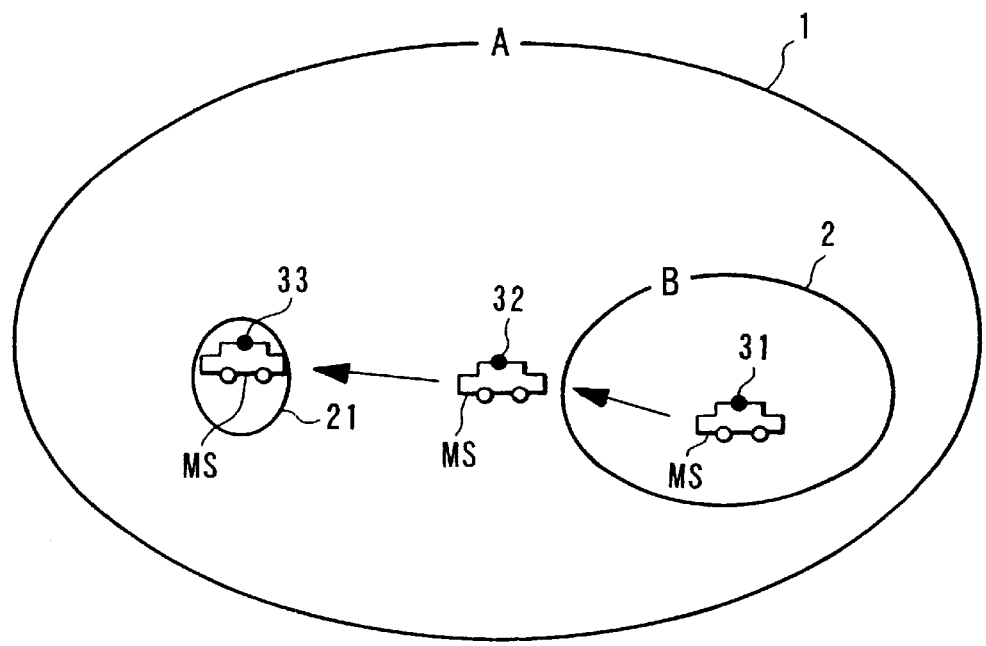
FIG. 3 is a conceptual drawing showing an example of a mobile communication system wherein the service area included in the larger service area in FIG. 2, has a distinct service area.
Figure 4:
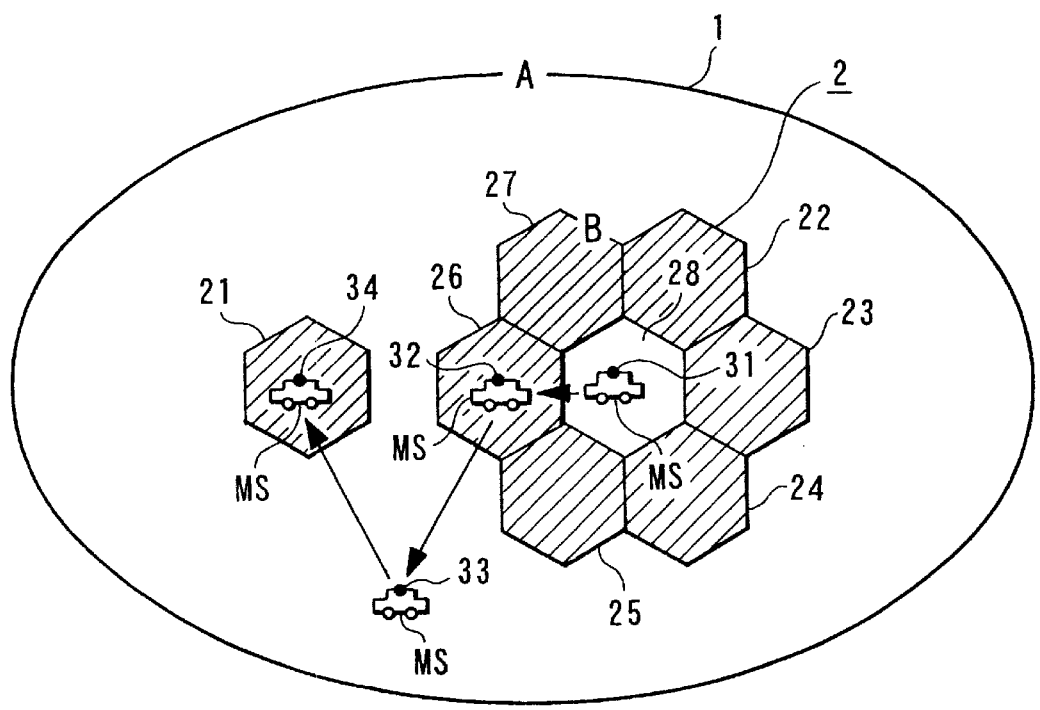
FIG. 4 is a conceptual drawing showing an example of the service area of the mobile communication system of the first embodiment of the present invention.

FIG. 4 is a conceptual drawing showing the mobile communication system of the first embodiment of the present invention. In FIG. 4, a service area 2 of a mobile communication system B is included inside service area 1 of a mobile communication system A, this service area 2 is constructed with a plurality of zones 21–28. Zone 21 is a distinct area of service area 2. System B has priority over system A in mode selection. The zones 21, 22, 23, 24, 25, 26 and 27, which are drawn with oblique lines, are located on edges of service area 2 of system B. In this first embodiment, the base station adds information showing that a zone is an edge of the service area to broadcast information sent from the base station to a calling control channel. Zone 28 is not a zone forming the edge of the service area, so that the base station does not add the information, including that a zone is an edge of the service area, to the broadcast information or to the calling control channel. Alternatively, in the case, the base station could add information which shows that a zone is not an edge of the service area to the broadcast information or the calling control channel.

The thresholds pa1, pa2, pb1 and pb2 for switching modes, are different from the in-area, out-area levels for mobile station MS which is not communicating by mode switching value. Furthermore, the mobile station MS can change thresholds pa1, pa2, pb1 and pb2 based on the received signal.

The received field strengths PA and PB of the mobile station MS at position 31 in zone 28 become PA>pa1 and PB>pb1.

As a result, although the mobile station MS may select modes of both systems A and B, the mobile station MS selects the mode B because system B has priority. At this time, when the mobile station MS, at the position 31 in the zone 28 is affected by temporary shadowing, the received field strengths PA and PB become PA>pa1 and PB<pb2.

In this case, the mobile station MS does not switch from the mode of system B to the mode of system A because the mobile station MS receives the broadcast information which shows that zone 28 is not an edge of the service area.

Next, when the mobile station MS moves from position 31 to position 32 in zone 26 at the edge of the service area, the received field strengths PA and PB of the mobile station MS at position 32 become PA>pa1 and
PB>pb1.

The mobile station MS maintains the mode setting at mode B because system B has priority. At this time, when the mobile station MS at position 32 in zone 26 is affected by temporary shadowing, the received field strengths PA and PB become PA>pa1 and
PB<pb2.

In this case, there is a possibility that the mobile station MS moves outside the service area of mode B because of receipt of broadcast information showing that zone 26 is an edge of the service area. However, in the process for switching to mode A, in practice, a hysteresys is provided to the switching using a timer. That is, the mobile station MS switches the mode when the conditions for mode switching are maintained for a predetermined time starting from when the conditions for mode switching are satisfied. Hereby, the mobile station MS does not carry out unnecessary mode switching, even when the received field strength changes due to the temporary shadowing.

Furthermore, when the mobile station MS moves from position 32 to position 33, which is outside service area 2 but inside of service area 1, the received field strengths PA and PB of the mobile station MS at the position 33 become PA>pa1 and
PB<pb2.

In this case, the mobile station MS switches to the mode of system A. At this time, a hysteresys is applied to the timing of mode switching by delaying the timing of mode switching using the timer. As a result, it is possible to reduce flapping of the mode at the edge of the service area in system B. In addition, for zones inside the area of mobile station MS which cause flapping, the base station changes the thresholds pa1, pa2, pb1 and pb2, and then makes the mobile station MS switch the mode forcibly. Thus, the base station sets the threshold pb2 to a lower value by using the control channel. As a result, the received field strengths PA and PB of the mobile station MS at position 32 in zone 26, at the same edge become PA>pa1 and
PB>pb2.

So that, it is possible that the mobile station MS maintains the mode of the system B.

Incidentally, there are the following two methods, among others, for detecting flapping of the mode switching. In a first method, the system detects the amount of traffic on a common control channel. When the traffic amount becomes larger than a predetermined value, the system judges that flapping is occurring, while when the amount of traffic falls below a predetermined value, the system judges that flapping is not occurring. In the second method, the system measures the lag time between a signal from mobile station MS and a standard signal, at the base station, and estimates the position of the mobile station MS on the basis of this lag time. In this way, the system judges whether flapping is occurring or not. In this case, the base station of system B measures now much signal S1 for position registration, which is transmitted from mobile station MS, differs from the standard signal (in the case of no difference, the timing of the receiving signal of the ascent channel from mobile station MS). Incidentally, the lag time Ta from the base signal when signal S1 sent from mobile station MS is received by the ground station is expressed by the following.

$Ta = 2 \cdot b/C$ where, b is the distance between a mobile station and a base station, and C is the speed of light.

When the lag time Ta is larger than a value predetermined as a parameter, then the base station judges that there is a possibility that flapping will occur, because the mobile station MS is at a location far from the base station and near the boundary of the service area. On the other hand, when the lag time Ta is smaller than the predetermined value, the base station judges that there is less likelihood that flapping will occur because the mobile station MS is near the base station and sufficiently inside the service area.

Next, when the mobile station MS moves from position 33 to positions 34 or 32, which are located in the zones 21 or 26 at the edge of service area 2, the received field strengths PA and PB of the mobile station MS become PA>pa1 and
PB>pb1.

In this case, although the mobile station MS can select modes of both systems A and B, the mobile station MS applies a hysteresys to the timing of the actual mode switching by using the timer, in order to avoid mode switching in the distinct service area. Alternatively, if the system recognizes zone 21 as a distinct area, then the base station may transmit the threshold pb1 of zone 21 as a larger value than a normal value of an electronic wave from the base station of system B. As a result, the mobile station MS at position 34 can not select the mode of system B. For example, when the transmitted level of the base station is 10 dB, it may transmit a value which is larger than the 10 dB, such as 15 dB. Furthermore, if the system controls the threshold pb1 according to the traffic of the control channel, it is allowable the mode switching with a probability without the congestion.

In addition, in the case where the quality of the receiving line deteriorates along with the received field strength, then if the mode is switched, it is possible to judge the mode selecting correctly. Alternatively, it is possible to use the receiving line quality instead of the received field strength. Further, it is possible to change the value of the hysteresys by transmitting the timer value with the broadcast information.

B. Second Embodiment

1. Construction of the Second Embodiment

Figure 5:
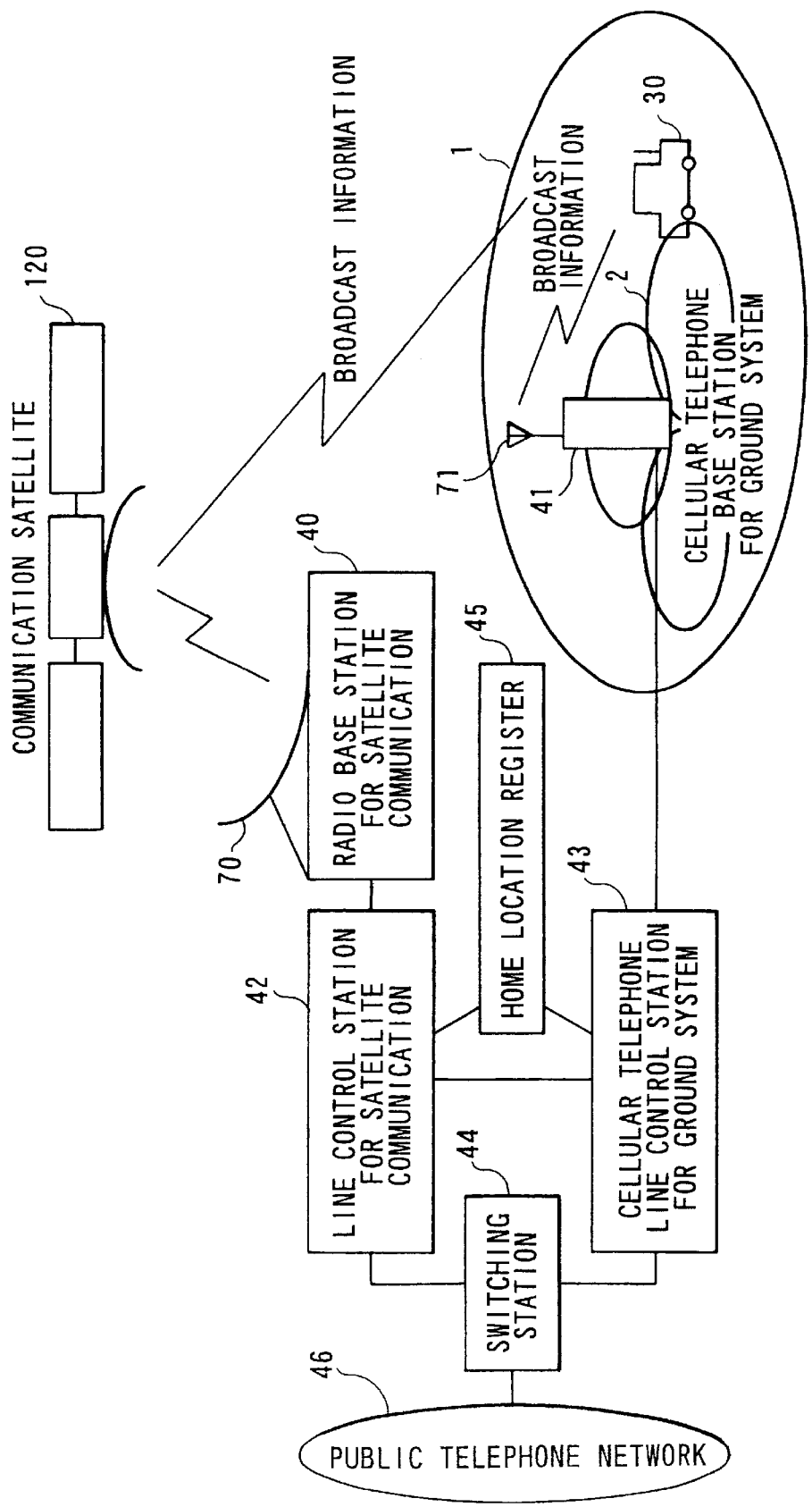
FIG. 5 is a block diagram showing an example of the structure of the systems in the second embodiment of the present invention.

An explanation will now be made of the second embodiment of the present invention with reference to the drawings. FIG. 5 is a block diagram showing a construction of the mobile communication system of the second embodiment of the present invention. In FIG. 5, a service area 2 for a cellular telephone ground system is included in service area 1 for satellite communications. Mobile station 30, which can communicate between service areas 1 and 2 by switching between the satellite communication system and the cellular telephone ground system, accepts any service from either communication system by moving in the service areas 1 and 2.

A radio base station 40 for satellite communication is connected to a switching center 44 through a line control station 42 for satellite communication. A ground system cellular telephone base station 41 is connected to the switching center 44 through a ground system cellular telephone line control station 43. Both control stations 42, 43 can access a home location register 45. The switching station 44 is connected to the public telephone network 46. Number 70 indicates a radio base station antenna for satellite communication, number 71 indicates a radio base station antenna for the ground system cellular telephone, and number 120 indicates a communication satellite.

The mobile station 30 receives broadcast information transmitted from the radio base station 40 for satellite communication through the communication satellite 120, and broadcast information transmitted from the ground system cellular telephone base station 41, and selects either the satellite mode or the ground mode. When the mobile station 30 selects the satellite mode, the mobile station 30 transmits position registration information through the communication satellite 120. The radio base station 40 for satellite communication transmits the position registration information transmitted from the mobile station 30 to the line control station 42 for satellite communication. The line control station 42 for satellite communication registers in the home location register 45 that the mobile station 30 is operating in the satellite mode. Similarly, when the mobile station 30 selects the ground mode, the mobile station 30 transmits the position registration information to the base station 41 for ground cellular telephone system. The base station 41 for ground cellular telephone system transmits the position registration information transmitted from the mobile station 30 to the line control station 43 for ground cellular telephone system. The line control station 43 for ground cellular telephone system registers that the mobile station 30 is operating in the ground mode in the home location register 45.

When sending to the mobile station 30, the switching center 44 accesses the home location register 45 of the mobile station 30 through the line control station 42 for satellite communication or through the line control station 43 for ground cellular telephone system, and reads out information showing whether the mobile station 30 is registered in the satellite mode or the ground mode. If the mobile station 30 is registered in the satellite mode, the switching center 44 transmits to the mobile station 30 through the radio base station 40 for satellite communication. In contrast, if the mobile station 30 is registered in the ground mode, then the switching center 44 transmits to the mobile station 30 through the base station 41 for ground system cellular telephone. Thus, the sender can transmit to the mobile station 30 without determining, whether the mobile station 30 is operating in the ground mode or the satellite mode.

Figure 6:
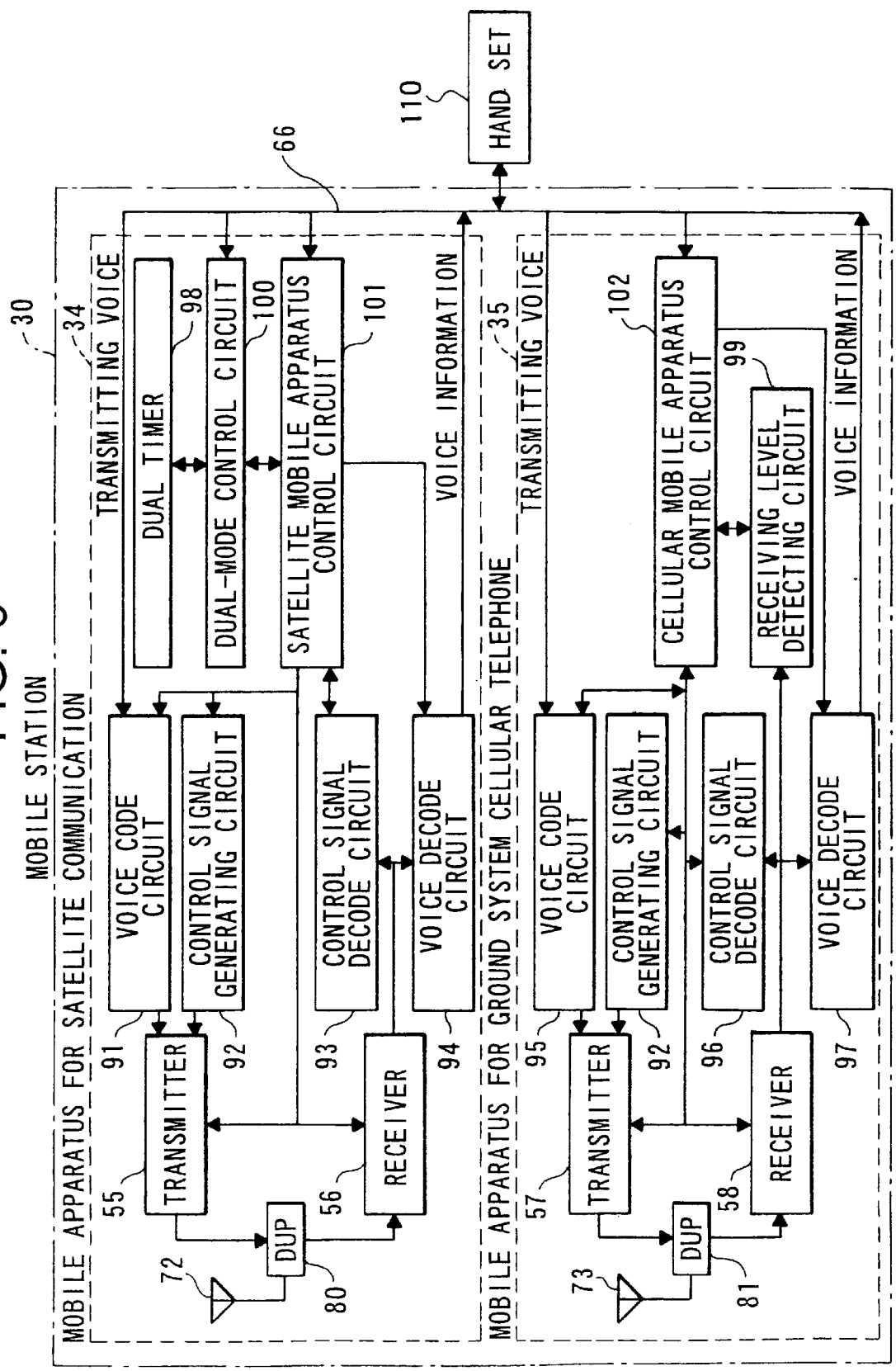
FIG. 6 is a block diagram showing a structural example of the mobile station in the second embodiment.

FIG. 6 is a block diagram showing the construction of a mobile station in the second embodiment. In FIG. 6, the mobile station 30 consists of a mobile apparatus 34 for satellite communication and a mobile apparatus 35 for cellular telephone ground system. In the mobile apparatus 34 for satellite communication, a transmitter 55 and a receiver 56 are connected to an antenna 72 for satellite communication through a DUP 80, and a voice code circuit 91 and a control signal generating circuit 92 are connected to the input side of the transmitter 55. Further, a control signal decode circuit 93 and a voice decode circuit 94 are connected to the output side of the receiver 56. A mobile station control circuit 101 for satellite communication controls the transmitter 55, the receiver 56, the voice code circuit 91, the control signal generating circuit 92, the control signal decode circuit 93 and the voice decode circuit 94.

In the mobile apparatus 35 for cellular telephone ground system, a transmitter 57 and a receiver 58 are connected to an antenna 73 through a DUP 81, and a voice code circuit 95 and a control signal generating circuit 92 are connected to the input side of the transmitter 57. Further, a control signal decode circuit 96, a voice decode circuit 97 and a received level detecting circuit 99 are connected to the output side of the receiver 58. A cellular mobile control circuit 102 controls the transmitter 57, the receiver 58, the voice code circuit 95, the control signal generating circuit 92, the control signal decode circuit 96 and the voice decode circuit 97.

In this second embodiment, a dual-mode control circuit 100 is instituted into the mobile apparatus 34 for satellite communication, and a dual-timer 98 is connected to the dual-mode control circuit 100. The input side of the voice code circuits 91, 95, the output side of the voice decode circuits 94, 97, the mobile station control circuit 101 for satellite communication, cellular mobile control circuit 102, dual-mode control circuit 100 and the hand set 110 are connected to each other via bus 66.

Figure 7:
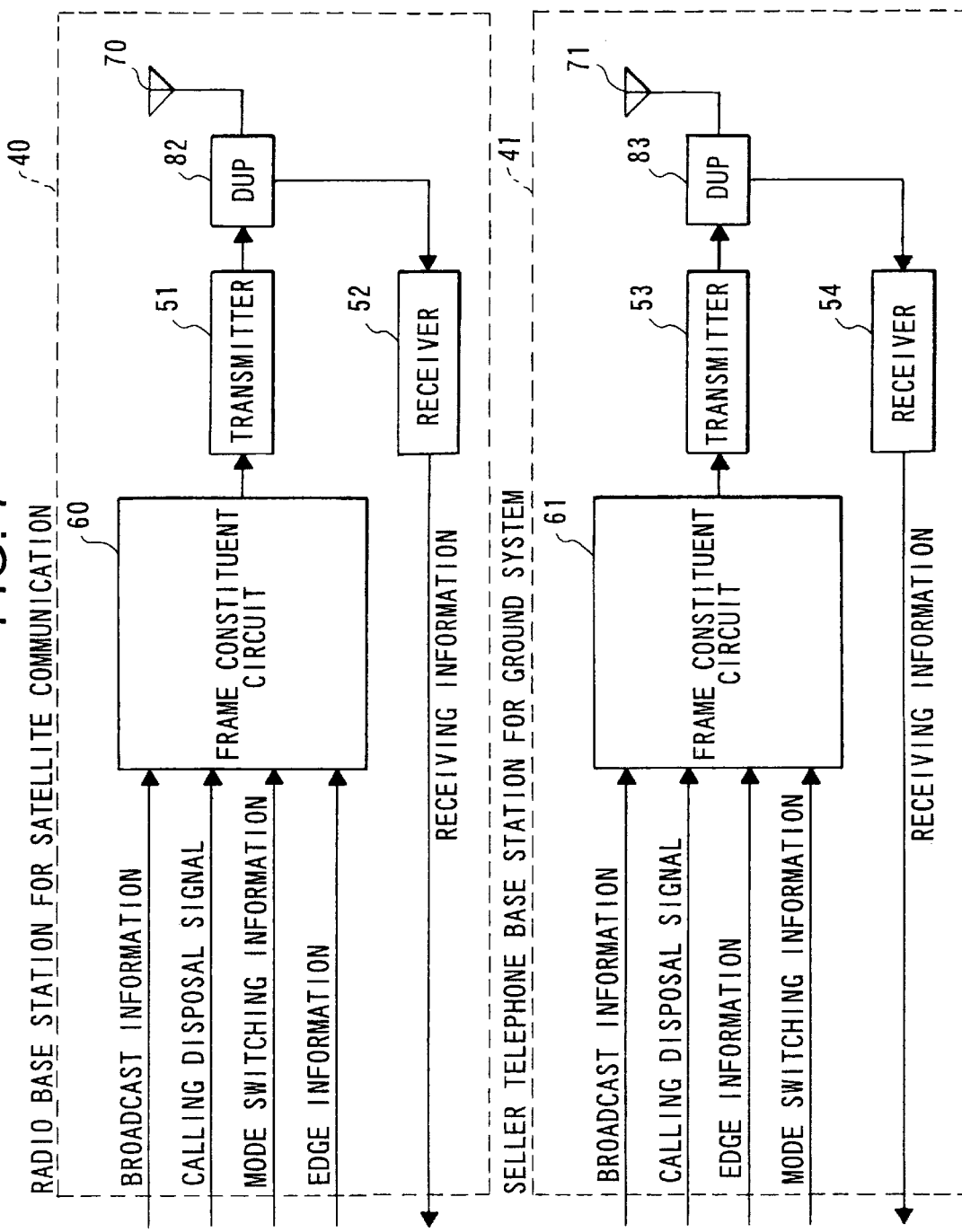
FIG. 7 is a block diagram showing a structural example of a base station in the second embodiment.

FIG. 7 is a block diagram showing the construction of base stations 40, 41 in the second embodiment. In FIG. 7, a transmitter 51 and a receiver 52 are connected to an antenna 70 through a DUP 82, and a frame constituent circuit 60 is connected to the input side of the transmitter 51, in the base station 40. Broadcast information, a calling disposal signal, mode switching information and edge information are inputted into the frame constituent circuit 60. The edge information shows that the mobile station is present at an edge of the service area.

In the base station 41, a transmitter 53 and a receiver 54 are connected to an antenna 71 through a DUP 83, and a frame constituent circuit 61 identical to the frame constituent circuit 60 is connected to an input side of the transmitter 53.

The mobile station 30 becomes a mobile station for ground system cellular telephone when the mobile apparatus 35 for ground system cellular telephone is operated in a single mode for ground cellular telephone system, after disconnecting the mobile apparatus 34 for satellite communication.

Figure 8:
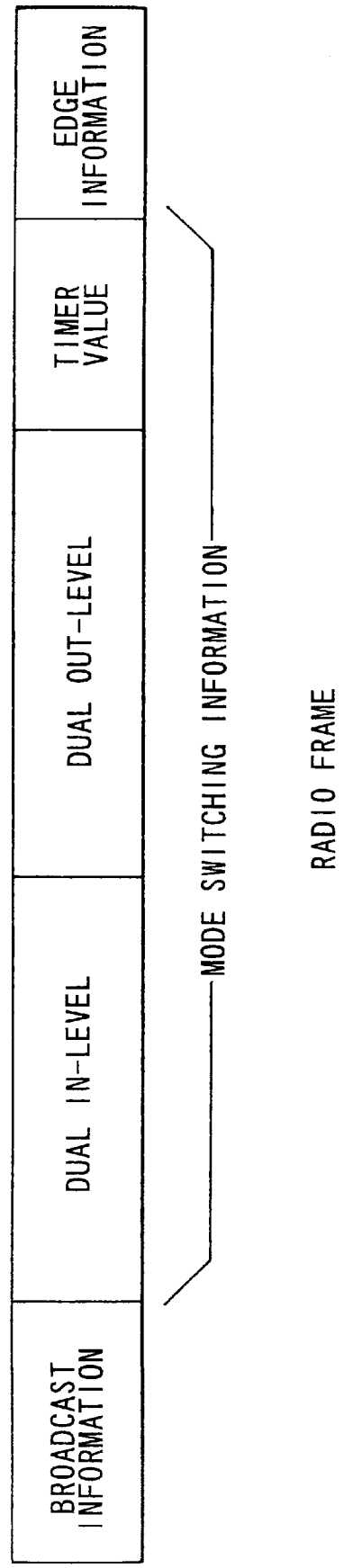
FIG. 8 is a diagram showing a structural example of a data frame between the base station and the mobile station in the second embodiment.

In the radio base station 40 for satellite communication and the base station 41 ground cellular telephone system, the frame constituent circuits 60, 61 form a radio frame to add the mode switching information and the edge information to the broadcast information, respectively, and transmits the radio frame with the common control channel. FIG. 8 is a diagram showing the construction of a data frame in the second embodiment. In this case, FIG. 8 is an example of transmission of the dual-in-level, the dual-out-level and the timer values as edge information and mode switching information. However, the mode switching information and the edge information are transmitted only when notification is necessary. This information become an idling state when not transmitted. In addition, when the mode switching information and the edge information are not transmitted, then the transmitting order of the mode switching information may be changed.

Figure 9:
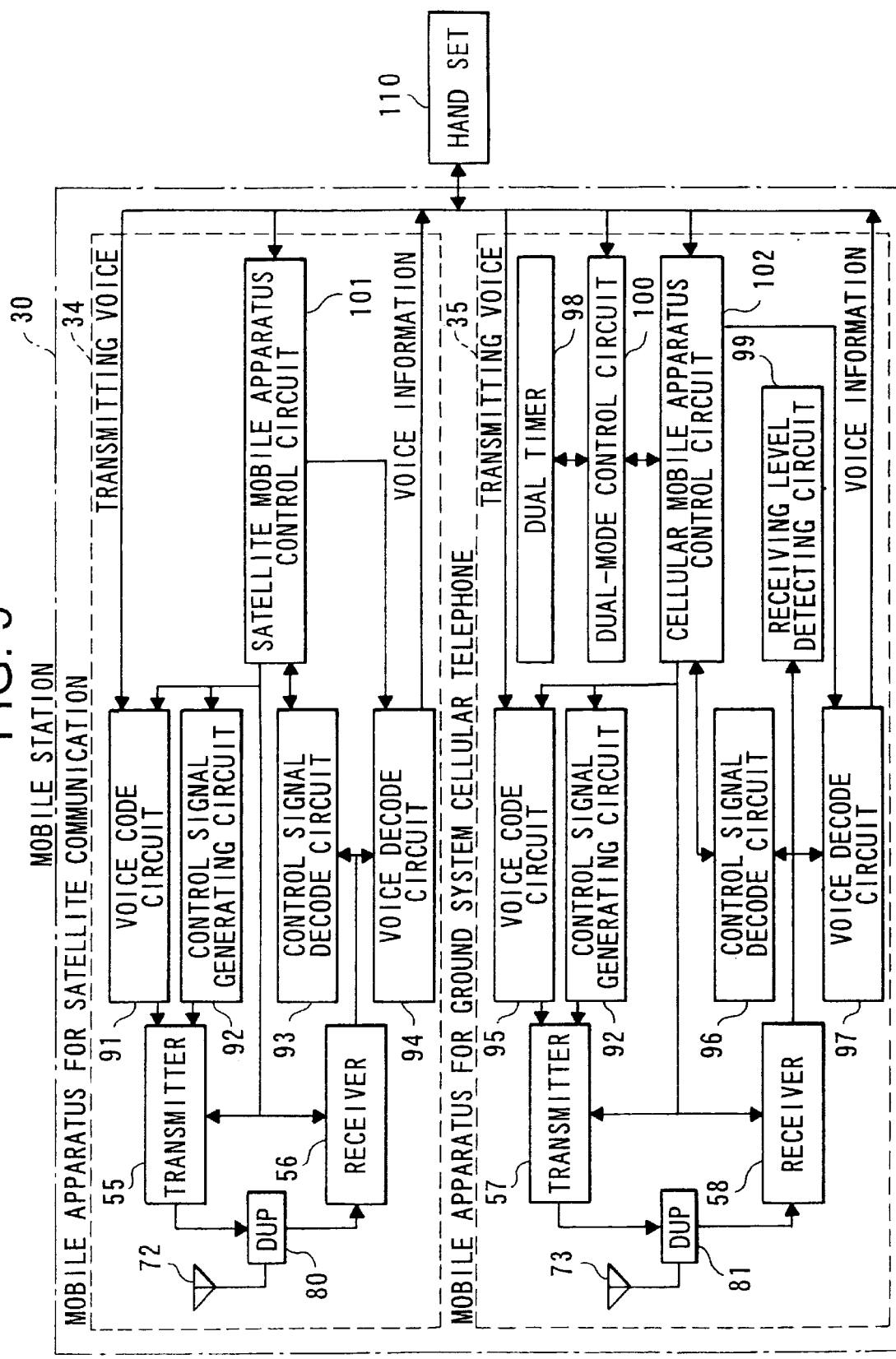
FIG. 9 is a block diagram showing another structural example of the mobile station in the second embodiment.
Figure 10:
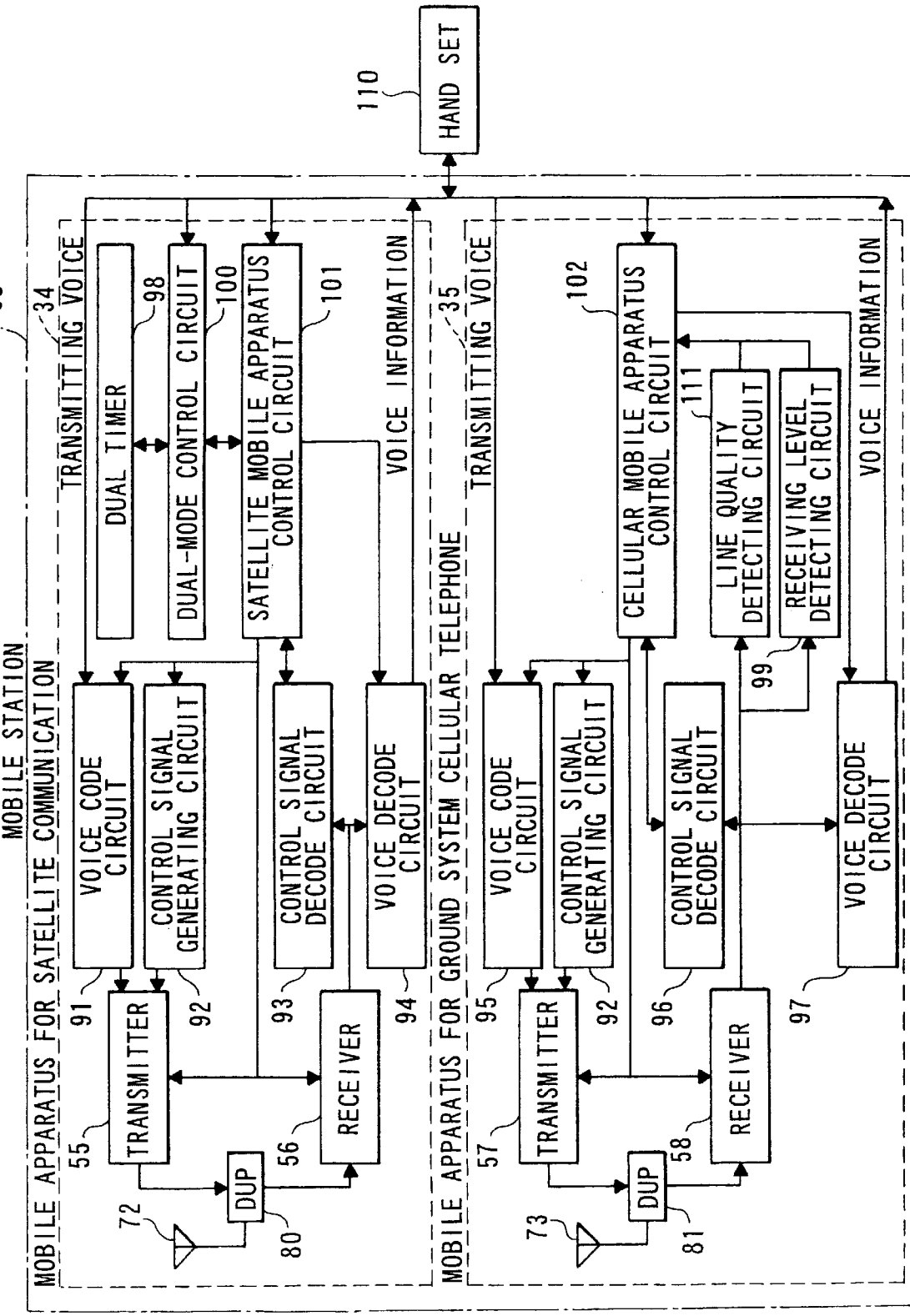
FIG. 10 is a block diagram showing another structural example of the mobile station in the second embodiment.

Furthermore, as shown in FIG. 9, the mobile apparatus 35 for cellular telephone ground system may also be provided with circuits related to the dual-mode control, namely, a dual-mode control circuit 100 and a dual-timer 98. In addition, as shown in FIG. 10, by connecting a line quality detecting circuit 11 to the receiver 58, a line quality may be used as a condition for mode switching. Furthermore, it is possible to replace the above mentioned circuits of the mobile station 30 with software.

2. Operation of the Second Embodiment

Figure 11:
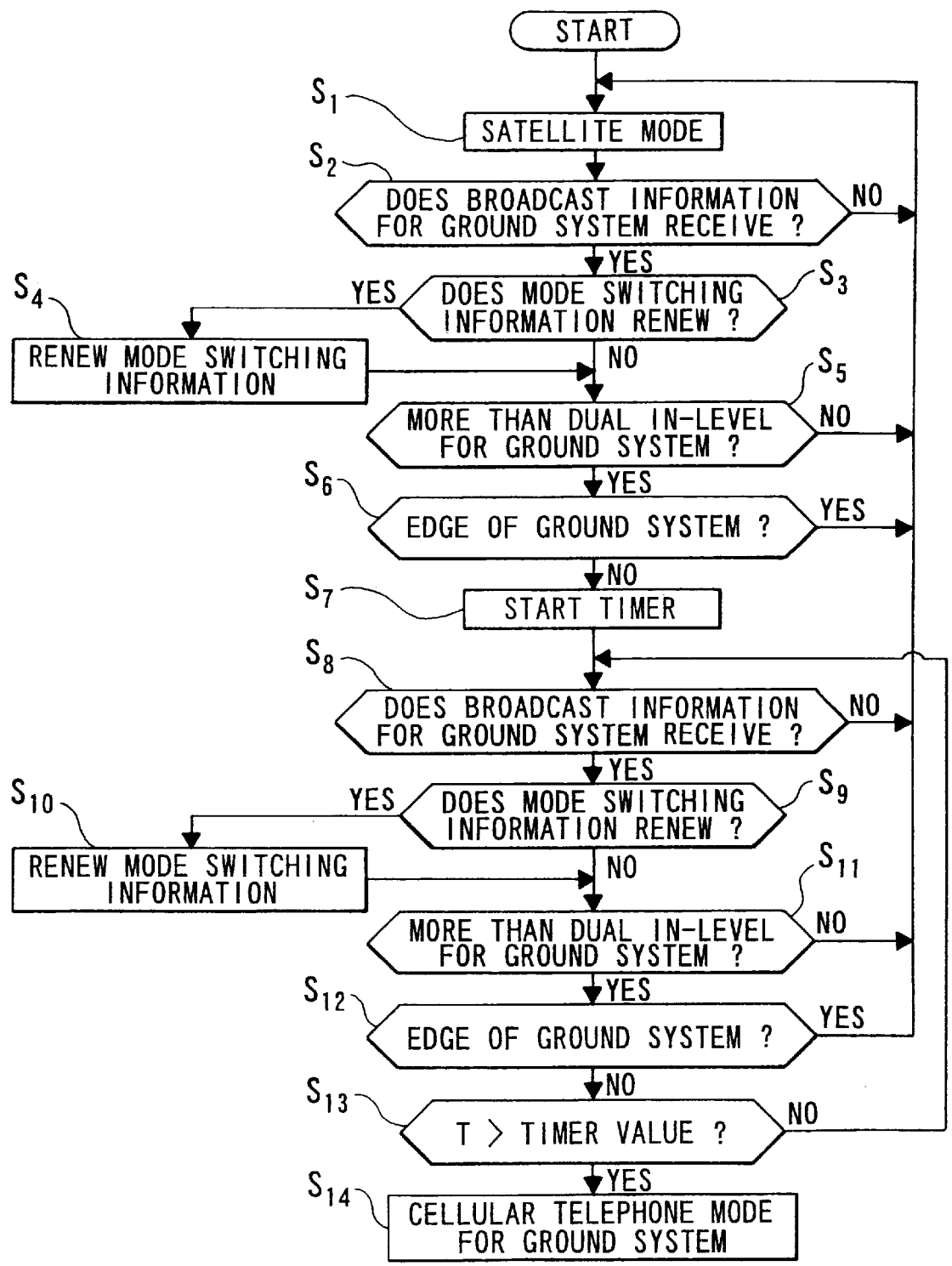
FIG. 11 is a flowchart showing the process for switching from satellite mode to ground mode in the second embodiment.

Next, the operation of the second embodiment will be explained with reference to the drawings. FIG. 11 is a flowchart showing the process for switching from satellite mode to ground mode in the second embodiment. In FIG. 11, the mobile station 30 selects the satellite mode (S1), in this condition, the mobile apparatus 35 for ground cellular telephone system is waiting to receive the broadcast information transmitted from the base station 41 of ground cellular telephone system (S2). When the mobile station 30 receives the broadcast information, the mobile station 30 checks whether the mode switching information included in the broadcast information, is different from the mode switching information stored into the dual-mode control circuit 101 of the mobile station 30 (S3). If the mode switching information is different, the mobile station 30 changes the mode switching information (S4). As a result, the base station can control the dual-in-level, the dual-out-level or the timer value.

Next, the mobile station 30 checks whether the receiving level at the mobile apparatus 35 for ground cellular telephone system is higher than the dual-in-level or not (S5). If the level is higher, then the mobile station 30 confirms the edge information (S6). When it is confirmed from the edge information that the mobile station 30 is not present at an edge of the service area of the ground cellular telephone system, the mobile station 30 starts a counting of the timer 98 for the dual-mode switching (S7). In this case, for example, the timer value is set at about one minute. Afterward, the mobile station 30 again waits to receive the broadcast information transmitted from the base station 41 for ground cellular telephone system (S8). Or the broadcast information is received, the mobile station 30 checks whether the mode switching information of the broadcast information is different from the mode switching information stored in the dual-mode control circuit 100 or not (S9). If the mode switching information is different, then the mobile station 30 renews the mode switching information stored in the dual-mode control circuit 100 (S10).

Next, the mobile station 30 checks whether the receiving level from the base station 41 for system cellular telephone ground is higher than the dual-in-level or not (S11). If the receiving level is higher than the dual-in-level, the mobile station 30 refers to the edge information to check whether it exists in an edge of the service area of the ground cellular telephone system or not (S12). If the mobile station 30 does not exist in an edge of the service area, then the mobile station 30 checks whether the timer value of the timer 98 is larger than the timer value of the broadcast information or not (S13). If the timer value of the timer 98 is not larger, then the processing returns to step S8, and the processing carries out repeatedly from step S8 to step S13. In this repetition processing, if the timer value of the timer 98 is larger than the time value of the broadcast information, the mobile station 30 carries out the position registration to the cellular telephone for ground system by switching the mode to the cellular mode for ground system (S14).

Figure 12:
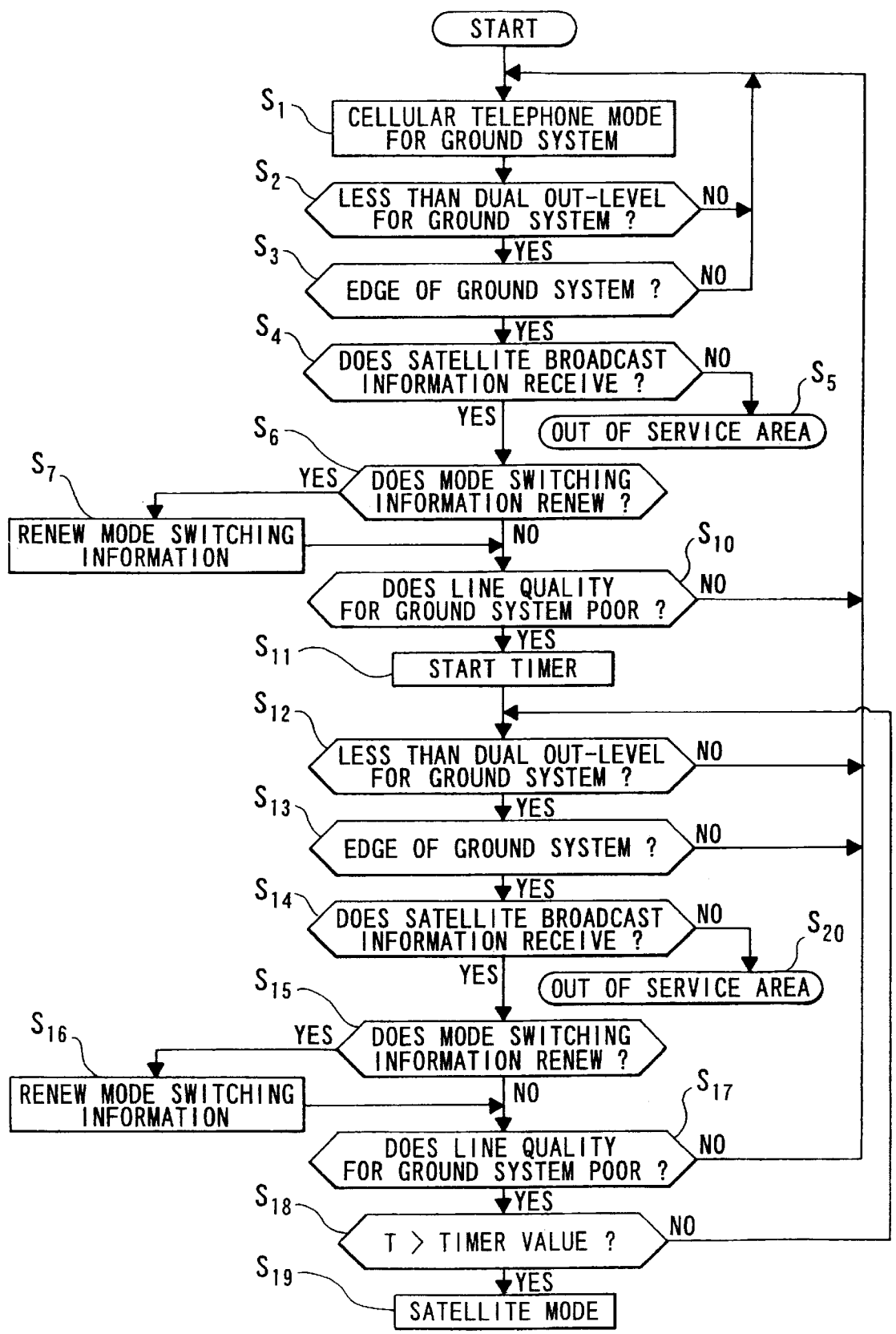
FIG. 12 is a flowchart showing a process for switching from ground mode to satellite mode in the second embodiment.

Using FIG. 12, an explanation will now be made of the case where the mobile station 30 which selects the cellular mode for ground system switches to the satellite mode. FIG. 12 is a flowchart showing the process for switching from ground mode to satellite mode in the second embodiment. In FIG. 12, the mobile station 30 receives a signal from the cellular telephone mobile apparatus 35 for ground system in the ground mode (S1), and observes whether the level of the received signal has become lower than the dual-out-level (S2). If the level is lower, the mobile station 30 confirms the edge information of the transmitting ground base station in the broadcast information thereof (S3). In the case where it is confirmed that the current zone in which the mobile station 30 is present is an edge of the service area in the cellular telephone for ground system, the satellite communication mobile apparatus 34 of the mobile station 30 receives the broadcast information transmitted from the radio base station 40 for satellite communication through the communication satellite (S4). However, in the case where the satellite communication mobile apparatus 34 does not receive the broadcast information, it is judged that the mobile station 30 is present outside each of the service areas of the satellite communication system and the cellular for ground system (S5).

On the other hand, when the mobile station 30 receives the broadcast information transmitted from the radio base station 40 for satellite communication, the mobile station 30 checks whether the informed mode switching information is different from the mode switching information stored into the dual-mode control circuit 101 or not (S6). If the mode switching information is different, the mobile station 30 changes the mode switching information in the dual-mode control circuit 101 (S7). On the contrary, if the informed mode switching information is the same as the stored mode switching information, the mobile station 30 checks whether the line quality of the ground system has deteriorated or not (S10). If the line quality has deteriorated, the mobile station 30 starts the counting of the dual-mode timer 98 (S11). This timer value is set for about one minute, for example.

Next, the mobile station 30 observes whether the receiving level has become equal to or less than the out-level of the dual ground system or not (S12). If the receiving level becomes equal to or less than the out-level, the mobile station 30 checks whether the edge information in the broadcast information indicates that its present position is in the edge of the cellular service area of the ground system or not (S13). If the present position is at the edge of the service area, the mobile station checks whether it can receive the broadcast information from the satellite communication or not (S14). Next, if the mobile station 30 can receive the broadcast information, the mobile station 30 checks whether the mode switching information in the broadcast information is different from that stored in dual-mode control circuit 100 or not (S15). If the mode switching information is different, the mobile station 30 renews the stored mode switching information to the received mode switching information (S16). However, in the case where the broadcast information from the satellite communication is not received, it is judged that the mobile station 30 is present outside each of the service areas of the satellite communication system and the cellular for ground system (S20).

On the other hand, if the received mode switching information is the same as the stored mode switching information, the mobile station 30 checks whether the line quality of the signal from the cellular base station for ground system has deteriorated beyond a predetermined value or not (S17). If the line quality has deteriorated, the mobile station 30 checks whether the timer value of the dual timer 98 becomes larger than the timer value of the broadcast information (S18). If the timer value of the dual timer 98 is not larger, the processing returns to step 12, with the processing carried out repeatedly from step S12 to step S18 until the timer value of the dual timer 98 exceeds the timer value of the broadcast information. Afterward, the mobile station 30 switches over the communication of the mobile apparatus 34 for satellite communication, and switches from the ground mode to the satellite mode (S19). Thus, when the above mentioned condition of the mode switching continues to be satisfied, and the timer value is larger than the timer value of the dual-mode switching information, the mobile station 30 switches to the satellite mode, and carries out position registration using satellite communication.

The proceeding explanation of FIGS. 11 and 12, explored an example where the receiving level, the line quality, the edge information and the timer value were used as conditions for the mode switching. However, if all these mode switching conditions are not necessary, then it is possible to use just one or more of these optional mode switching information items as the condition for mode switching. In this case, the conditions shown in FIGS. 11 and 12 may be omitted. Furthermore, in FIGS. 11 and 12, the cellular telephone mode for ground system and the satellite mode may be exchanged. In addition, satellite communication may be exchanged for other cellular telephones for ground system, in this second embodiment making it possible to employ a method for mode switching using two cellular telephone for ground systems.

Figure 13:
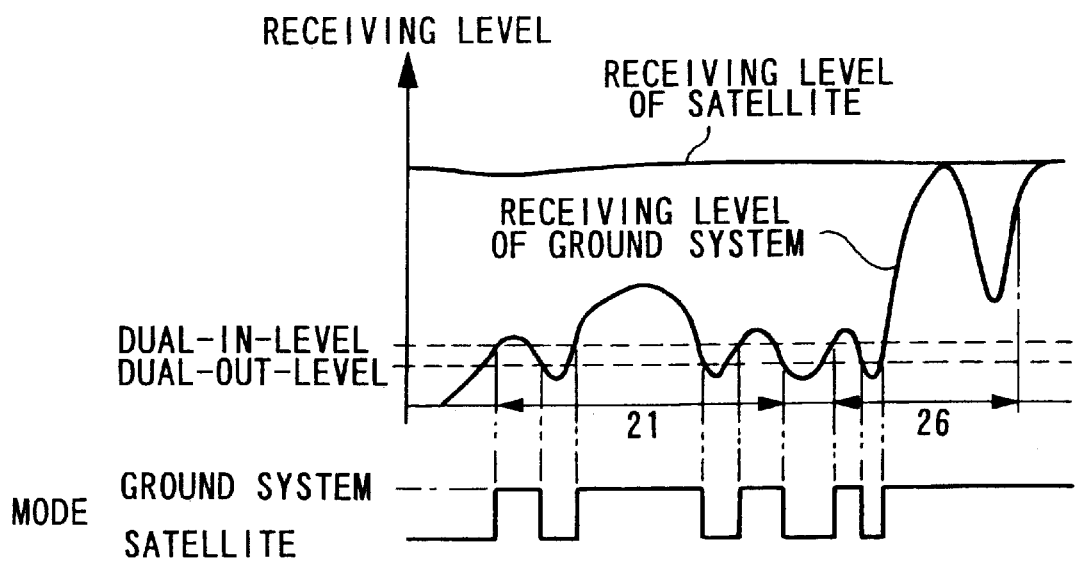
FIG. 13 is a diagram showing an example of the mode switching state and the transition in receiving levels in the conventional method.
Figure 14:
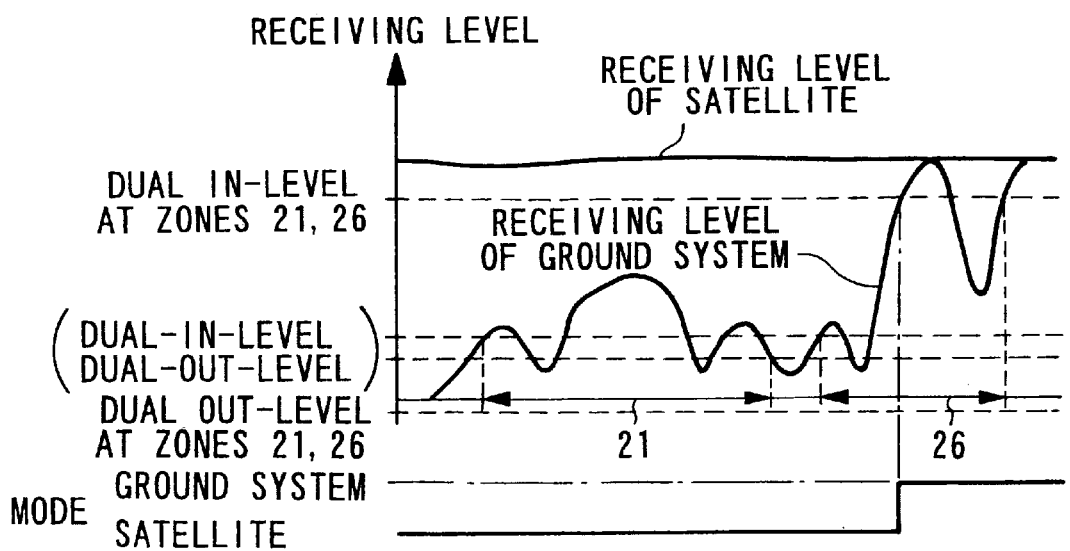
FIG. 14 is a diagram showing o an example of the mode switching state and the transition in receiving levels in the case where applying the second embodiment of this present invention.

Next, FIGS. 13 and 14 are diagrams showing examples of the control of dual-mode control in each zone at the base station. In FIGS. 13 and 14, the receiving level of the mobile station 30 is indicated on the vertical axis, while the position of the mobile station 30 is indicated on the horizontal axis, the point of horizontal axis and vertical axis intersection is an in-zone level and an out-zone level for a single mode. Furthermore, FIGS. 13 and 14 show the change in the receiving level in the case where the mobile station 30 moves from zone 21, which forms an edge of the service area for a cellular telephone for ground system, to zone 26, which is not an edge of the service area in the cellular telephone for ground system.

FIG. 13 is a diagram showing the conventional method. In FIG. 13, although the dual mode in-level is set higher than the dual mode out-level, these levels are relatively close to each other. As a result, the mobile station 30 carries out the mode switching many times between the satellite system and the cellular telephone for ground system, in zone 21. If there are many mobile stations 30 which carry out the above-mention repetition, the traffic on the control channel increases, so that congestion occurs. Therefore, in this second embodiment, in this case, the system changes the mode switching information (see FIG. 8), which is transmitted from the base station 41 of zones 21, 26. More concretely, as shown in FIG. 14, the system causes the dual-mode in-level to increase, and causes the dual-mode out-level to decrease. As a result, the mobile station which selects the cellular telephone for ground system in zone 21, cannot carry out the mode switching to switch to the satellite mode, while the mobile station, which selects the satellite mode cannot carry out the mode switching to switch to the cellular telephone for ground system.

The dual-mode in-level and the dual mode out-level are changed according to the procedure below. First, the cellular telephone line control station 43 for ground system observes the traffic on the control channel. When the traffic exceeds a predetermined value, the control station 43 sets a new dual mode in-level and dual mode out-level, and informs the new levels to the cellular telephone base station 41 for ground system of zones 21 and 26. Then, the newly set dual-mode in-level and dual-mode out-level are communicated from the cellular telephone base station 41 for ground system to the mobile station 30 in zones 21 and 26 as mode switching information.

Incidentally, in the notification of the mode switching parameters, the edge information is informed by the cellular telephone base station for ground system, while other information may be transmitted from the base station for either the cellular communication for ground system or the satellite communication.

In addition, it is possible to change the timer value for applying a hysteresys (delay) to the timing of the mode switching, in accordance with the edge information and the application mode. That is, in case where the mobile station 30 detects the edge information in the cellular mode for ground system, the timer value is set to about one minute, for example. Conversely, when the mobile station 30 detects the edge information under the satellite mode, the timer value is set to about eight seconds, for example. As a result, the system is designed so that the mobile station 30 selects as the cellular mode for ground system as often as possible. Furthermore, when the mobile station 30 cannot detect the edge information under the cellular mode for ground system, the timer value is set to about three minutes, while when edge information is detected, the timer value is set to be longer than about one minute. On this point, the cellular communication for ground system is used more than the satellite communication.

As described hereto, by means of this invention, it is possible to prevent flapping when mode selecting, and restrain the increasing of the traffic on the control channel.

What is claimed is:

1. A mode switching method for a mobile station which communicates by switching between a first communication mode connected to a first mobile communication system and a second communication mode connected to a second mobile communication system, wherein a portion of the service area of said first mobile communication system and the service area of said second mobile communication system overlap, the method comprising the steps of:

transmitting a threshold information including at least a field strength threshold and time information indicating time to said mobile station for switching the mode from a base station of at least one of said first mobile communication system and said second mobile communication system;

storing said threshold information in said mobile station;

producing an assessment information based on a received signal in said mobile station;

comparing said assessment information with said threshold information in said mobile station;

switching said first communication mode and said second communication mode based on said threshold information received in said mobile station;

detecting in said mobile station a received field strength;

comparing the received field strength with said field strength threshold;

switching said first communication mode and said second communication mode on the basis of the compared result, switching the communication mode when conditions for mode switching are maintained during a predetermined time beginning from when the conditions for mode switching come into existence; and setting said predetermined time on the basis of said time information.

2. A mode switching method for a mobile station which communicates by switching between a first communication mode connected to a ground cellular communication system and a second communication mode connected to a satellite communication system, wherein a portion of the service area of said ground cellular communication system and the service area of said satellite communication system overlap the method comprising the steps of:

transmitting a threshold information to said mobile station for switching the mode from a base station of at least one of said ground cellular communication system and said satellite communication system;

storing said threshold information in said mobile station;

producing an assessment information based on a received signal in said mobile station;

comparing said assessment information with said threshold information in said mobile station;

switching said first communication mode and said second communication mode based on said threshold information received in said mobile station;

detecting in said mobile station a received field strength;

comparing the received field strength with said field strength threshold;

switching said first communication mode and said second communication mode on the basis of the compared result;

said field strength threshold including an in-threshold which is referenced by said mobile station when said mobile station goes into the service area, and an out-threshold which is referenced by said mobile station when said mobile station goes out of the service area; and increasing said in-threshold or decreasing said out-threshold when said mobile station exists in the boundary region between the service areas.

3. A mode switching method for a mobile station which communicates by switching between a first communication mode connected to a ground cellular communication system and a second communication mode connected to a satellite communication system, wherein a portion of the service area of said first mobile communication system and the service area of said second mobile communication system overlap, the method comprising the steps of:

transmitting a threshold information including at least a field strength threshold to said mobile station for switching the mode from a base station of at least one of said first mobile communication system and said second mobile communication system;

storing said threshold information in said mobile station;

producing an assessment information based on a received signal in said mobile station;

comparing said assessment information with said threshold information in said mobile station;

switching said first communication mode and said second communication mode based on said threshold information received in said mobile station;

detecting in said mobile station a received field strength;

comparing the received field strength with said field strength threshold;

switching said first communication mode and said second communication mode on the basis of the compared result;

switching the communication mode when conditions for mode switching are maintained during a predetermined time beginning from when the conditions for mode switching comes into existence; and said predetermined time is a set as a larger value when the communication mode is switched from the communication mode of said ground cellular communication system to the communication mode of said satellite communication system than when the communication mode is switched from the communication mode of said satellite communication system to the communication mode of said ground cellular communication system.

4. A mode switching method for a mobile station which communicates by switching between a first communication mode connected to a ground cellular communication system and a second communication mode connected to a satellite communication system, wherein a portion of the service area of said ground cellular communication system and the service area of said satellite communication system overlap, the method comprising the steps of:

transmitting a threshold information including at least a field strength threshold to said mobile station for switching the mode from a base station of at least one of said ground cellular communication system and said satellite communication system;

storing said threshold information in said mobile station;

producing an assessment information based on a received signal in said mobile station;

comparing said assessment information with said threshold information in said mobile station;

switching said first communication mode and said second communication mode based on said threshold information received in said mobile station;

detecting in said mobile station a received field strength;

comparing the received field strength with said field strength threshold;

switching said first communication mode and said second communication mode on the basis of the compared result;

switching the communication mode when conditions for mode switching are maintained during a predetermined time beginning from when the conditions for mode switching comes into existence; and said predetermined time is set as a smaller value when edge information showing that said mobile station exists at a boundary region of the service area is detected than when said edge information is not detected.

* * * * *

UNITED STATES PATENT AND TRADEMARK OFFICE
CERTIFICATE OF CORRECTION

PATENT NO. : 5,950,127
DATED : September 7, 1999
INVENTOR(S) : Kazumasa Nitta et al.

It is certified that error appears in the above-identified patent and that said Letters Patent is hereby corrected as shown below:

On the Title Page

In column 1, item [73], delete "Mobile" and substitute --NTT Mobile-- in its place.

In the Claims

In claim 1, line 28, delete "," (comma) and substitute --;-- (semicolon) in its place.

In claim 3, line 32, delete "a" (first occurrence).

Signed and Sealed this

Twenty-ninth Day of May, 2001

Attest:

NICHOLAS P. GODICI

Attesting Officer

Acting Director of the United States Patent and Trademark Office